United States Patent [19]

Rush et al.

[11] 3,912,928

[45] Oct. 14, 1975

[54] PERMANENTLY CODED POLYMERIC COMPOUND AND METHOD OF CODING AND IDENTIFYING SAME

[75] Inventors: James B. Rush; Arthur D. Logan, both of Waynesville, N.C.

[73] Assignee: Dayco Corporation, Dayton, Ohio

[22] Filed: May 6, 1974

[21] Appl. No.: 467,369

[52] U.S. Cl. ............... 250/302; 250/459; 250/461; 250/483
[51] Int. Cl.² ......................................... G01N 21/38
[58] Field of Search ........... 250/302, 304, 361, 367, 250/458, 459, 461, 483

[56] References Cited
UNITED STATES PATENTS

| | | | |
|---|---|---|---|
| 2,853,620 | 9/1958 | Fox et al. ............................ 250/367 |
| 3,356,616 | 12/1967 | Sandler et al. .................. 250/483 X |
| 3,444,372 | 5/1969 | DeHart .............................. 250/483 |
| 3,829,700 | 8/1974 | Buchanan et al. .................. 250/483 |
| 3,839,069 | 10/1974 | Linturn ........................... 250/483 X |

Primary Examiner—Archie R. Borchelt
Attorney, Agent, or Firm—Reuben Wolk

[57] ABSTRACT

A permanently coded polymeric compound and method of permanently coding and identifying same is provided and such method includes the steps of dispersing particles of a particular phosphor throughout the polymeric compound during compounding thereof to provide a coded compound, freshly exposing a surface of the permanently coded compound after provision thereof, subjecting the freshly exposed surface to a source of radiant energy causing the particles to absorb the radiant energy and thereby cause excitation thereof, whereupon the excited phosphor particles emit radiant energy which is identified to thereby identify the particular phosphor and thus its polymeric compound.

25 Claims, 4 Drawing Figures

PERMANENTLY CODED POLYMERIC COMPOUND AND METHOD OF CODING AND IDENTIFYING SAME

BACKGROUND OF THE INVENTION

There are numerous uses of polymeric compounds, such as elastomeric compounds, for example, in the manufacture of various end products including endless power transmission belts, hose constructions, conveyor belts, and traction belts to name but a few. Conventional means used to code these compounds usually involve some sort of physical marking which is often lost or destroyed during processing or destroyed after an end product has been manufactured and used in service for an extended time. Time consuming analysis is then necessary to establish proper identification of the compound sought to be identified.

SUMMARY

This invention provides a polymeric compound which is permanently coded and may be quickly identified during processing thereof or after the compound has been used in service is an end product application. The invention also provides an improved method of permanently coding and identifying a polymeric compound and such method includes the steps of dispersing particles of a particular phosphor therethrough in a random manner during compounding thereof to provide a coded compound, freshly exposing a surface of the coded compound after provision thereof, subjecting the freshly exposed surface to a source of radiant energy causing the said particles to absorb radiant energy to provide momentary excitation thereof and allowing said excited phosphor particles to emit radiant energy which is identifiable, and identifying said emitted radiant energy to identify said particular phosphor and thus its polymeric compound.

BRIEF DESCRIPTION OF THE DRAWING

The accompanying drawing shows present preferred embodiments of this invention, in which.

DETAILED DESCRIPTION

Figure 1:
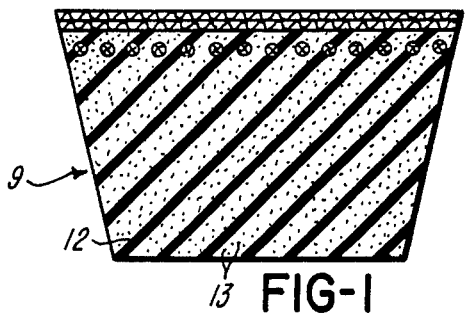
FIG. 1 is a cross-sectional view of an exemplary endless power transmission belt made from a permanently coded elastomeric compound.
Figure 2:
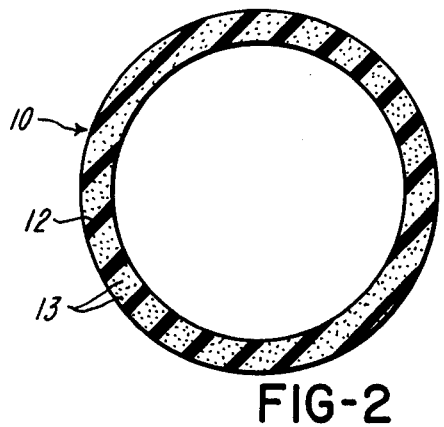
FIG. 2 is a cross-sectional view of an exemplary hose construction made from a permanently coded elastomeric compound.
Figure 3:
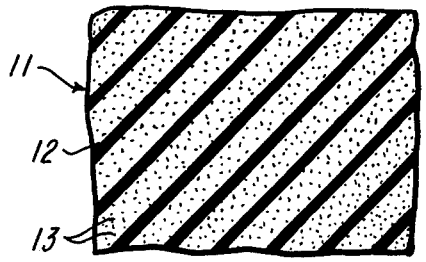
FIG. 3 is a fragmentary cross-sectional view of a conveying means made from a permanently coded elastomeric compound.

Reference is now made to FIGS. 1, 2, and 3 of the drawing which illustrate cross-sectional views of an endless power transmission belt, hose construction, and a fragment of conveying means in the form of an endless track for a snowmobile, or the like, which are designated by the reference numerals 9, 10, and 11 respectively and each component 9–11 is made of a permanently coded polymeric compound in the form of an elastomeric compound which is designated by the same reference numeral 12 in each FIG. 1, 2, and 3. Further, and for simplicity, the same elastomeric compound 12 is shown as being used to make components 9, 10, and 11 and is used throughout each; however, it will be appreciated that different elastomeric compounds would in all probability be utilized to make each of these end items. Also each component 9, 10, and 11 may have different component portions or layers made of different elastomeric compounds. Nevertheless, each different compound would be coded and identified in a similar manner as the compound 12.

The elastomeric compound 12 has particles 13 of a particular phosphor, which has known properties and a known chemical composition, dispersed therethrough in what may be considered a random manner; and, such particles are present substantially uniformly throughout the compound 12.

The type of phosphor employed in compound 12 is an inorganic phosphor which is thermally stable at temperatures below 400° F. Such phosphor becomes momentarily excited when exposed to a source of radiant energy, whereupon the excited phosphor particles emit radiant energy which is identifiable and enables identification thereof and hence its associated polymeric compound. Any one of several inorganic phosphors (to be subsequently described in more detail) may be employed in a particular polymeric compound and each phosphor is chemically inert with respect to its polymeric compound. In applications where the polymeric compound is in the form of an elastomeric compound, particularly good results have been obtained using a phosphor which absorbs ultraviolet radiation and emits visible radiation. Visualization (defined herein as detection by a set scientific procedure) with ultraviolet radiation is used to identify the particular phosphor and hence its elastomeric compound since during compounding of such compound documentation would be made of which particular phosphor was employed therewith. Similarly, a manufacturing company might employ a particular phosphor for all of its products of a particular class.

The particles 13 of a particular phosphor are preferably of a size generally of the order of 25 microns median diameter or less and such particles 13 are preferably dispersed into the compound 12 during compounding thereof regardless of the technique which is used to achieve compounding. When the elastomeric compound 12 is in the form of a rubber compound, either natural or synthetic, the particles 13 may randomly be dispersed and compounded therewith while compounding the compound 12 in the usual Banbury, mill, or the like. The end product which may be belt 9, hose construction 10, conveying means is the form of a belt conveyor or snowmobile track 11 or some other end product may then be formed; and, in the process of completing the end product, vulcanization of the rubber is achieved in accordance with techniques which are well known in the art. However, the compound 12 is permanently coded with the dispersion of particular phosphor particles 13 therethrough and may be identified at any time, either before vulcanization or after vulcanization and after the end product has been in use over an extended time period which may be as much as several years, or more. Similar identification may be achieved when using compounds 12 which do not require vulcanization and which may be cured or uncured.

Figure 4:
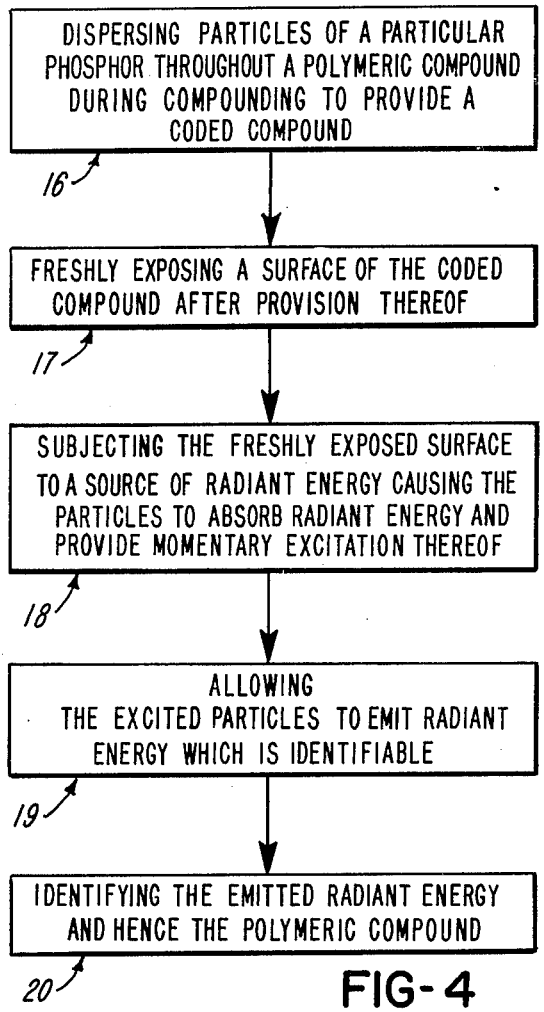
FIG. 4 is a block presentation of typical steps comprising the method of this invention which may be utilized to make a permanently coded polymeric compound.

Having described typical permanently coded end items in the form of belt 9, hose construction 10, and snowmobile track 11 made using a permanently coded polymeric compound 12, the detailed description will now proceed with a description of the unique method of this invention which enables permanent coding of a particular polymeric compound and for this description reference is made to FIG. 4 of the drawing.

In particular, the method comprises the steps of dispersing particles of a particular inorganic phosphor throughout a polymeric compound during compounding thereof to provide a coded compound and as indicated by the block at 16 in FIG. 3. Once the particular or known phosphor has been introduced in the known polymeric compound positive identification thereof and hence of such compound may be carried at any time thereafter by method steps which include the step of freshly exposing a surface of the compound as indicated by the block at 17. The freshly exposed surface may be provided by cutting into the compound or cutting or otherwise extracting a sample from a part of such compound. The freshly exposed surface is then subjected to a source of radiant energy causing the phosphor particles thereof to absorb radiant energy and provide momentary excitation of such particles as shown by the block at 18. The absorbed energy is partially lost by the particles in the form of radiant energy (lower in level than the exciting energy) which is identifiable and as shown at 19 whereupon the emitted radiant energy is identified as shown at 20 to identify the particular phosphor; and, since it was recorded during compounding that such phosphor (in the form of particles 13, for example) was compounded in a particular compound (such as compound 12) identification of the phosphor results in identification of the particular compound.

The steps of this invention may be carried out during processing of the polymeric compound before an end product is made or after an end product has been made. Further, in those instances where the polymeric compound is in the form of an elastomeric compound the method steps may be achieved before or after curing or vulcanization depending on the type of compound.

In permanently coding and identifying elastomeric compounds in accordance with this invention it has been found that the step of subjecting the freshly exposed surface to a source of radiant energy may be achieved with optimum economy by subjecting the freshly exposed surface to a source of radiant energy confined to the ultraviolet portion of the electromagnetic spectrum and this may be achieved using various commercially available lamps which emit ultraviolet light of various wavelengths and intensities.

As indicated at 19, phosphor particles in the freshly exposed surface which have been excited by absorption of ultraviolet radiation, emit radiant energy in the form of visible light which is identifiable. The emitted visible light may be suitably identified as by visual observation with the human eye which detects the color emitted by the phosphor. However, it will be appreciated that any suitable visualization technique may be employed and preferably in a dark environment. Once such color has been established and the fact that a phosphor capable of emitting such a color was used with a particular elastomeric compound established from permanent records it serves as a permanent identification of such elastomeric compound.

An example of an ultraviolet lamp which has been used to subject a freshly exposed surface of an elastomeric compound to ultraviolet radiation is a lamp which is produced by the UltraViolet Products, Inc., Walnut Grove Avenue, San Gabriel, Calif. 91778 of U.S.A., and designated UVS-11; and such a lamp produces light intensity of 140 uw/cm$^2$ at 254nm at 6 inches distance. Another apparatus which produces ultraviolet radiation into a dark sample chamber is a hand-portable dark room manufactured by UltraViolet Products, Inc. and designated CC-20, and such hand-portable dark room is roughly one cubic foot in size and provides instant visual analysis.

In this disclosure of the invention the detailed description has been made describing the utilization of radiant energy in the form of ultraviolet radiation; however, it will be appreciated that a freshly exposed surface of a particular compound containing a phosphor may be subjected to other forms of radiant energy such as X-rays, cathode rays, alpha particles, and the like whereupon the phosphors may emit part of the energy after excitation thereof in the ultraviolet region, visible region, or infrared region of the electromagnetic spectrum.

In this disclosure of the invention particular reference has been made to permanently coded polymeric compounds in the form of elastomeric compounds and the method of coding such compounds and such compounds may be any natural or synthetic rubber or any synthetic plastic material.

It will also be appreciated that thermoplastic materials and adhesive compounds may be permanently coded using phosphors in accordance with the teachings of this invention. Further, the method of coding and identifying such thermoplastic materials and adhesive compounds would be similar to the method described herein. It is believed that identification of thermoplastic materials and adhesive compounds is feasible utilizing phosphors as disclosed herein because such phosphors would be chemically inert and would be isotropically dispersed in their associated compounds.

In this disclosure of the invention, FIGS. 1, 2, and 3 have been cross-hatched as rubber for convenience and ease of presentation; however, it is to be understood that when the compound 12 is a synthetic plastic compound it would be appropriately cross-hatched to indicate plastic.

Having described permanently coded articles of this invention as well as the method of this invention, a table will now be presented of typical phosphors manufactured by the General Electric Company of Cleveland, Ohio which may be utilized in practicing this invention to code compounds of this invention and practice the method of this invention as follows.

| PHOSPHOR REFERENCE DATA | | | |
|---|---|---|---|
| JEDEC Designation | P22 | P31 | Special |
| Catalog Identification | 118-3-30 | 118-2-17 | 118-2-30 |
| Chemical Designation | YVO$_4$:Eu | ZnS:Cu | ZnSiO$_4$Mn |
| Emission Color | Red | Green | Green |
| C. I. E. Color:x | .670 | .305 | — |
| y | .320 | .560 | — |
| Peak Wave Length (nm) | 619 | 535 | 528 |
| Spectral Energy Distribution | Line Emitters | 430–610 | 496–575 |

PHOSPHOR REFERENCE DATA
10% Points (nm.)

| | | | |
|---|---|---|---|
| Coulter Counter | 6–10 | 11.5 | 2.4 |
| Fisher No. (FSSS) | 6–8 | 6.5 | 1.6 |
| Bulk Density (gm/cu.in.) | 18–28 | — | — |

While present exemplary embodiments of this invention, and methods of practicing the same, have been illustrated and described, it will be recognized that this invention may be otherwise variously embodied and practiced within the scope of the following claims.

What is claimed is:

1. A method of permanently coding and identifying a particular polymeric compound using phosphor particles to provide the coding comprising the steps of, dispersing particles of a particular phosphor throughout said polymeric compound during compounding thereof to provide a coded compound, freshly exposing a surface of the coded compound after provision thereof, subjecting the freshly exposed surface to a source of radiant energy causing said particles to absorb said radiant energy to provide excitation thereof and allowing said excited phosphor particles to emit radiant energy which is identifiable, and identifying said emitted radiant energy to identify said particular phosphor and thus its polymeric compound.

2. A method as set forth in claim 1 in which said identifying step is achieved by visual means.

3. A method as set forth in claim 1 in which said dispersing step comprises dispersing particles of an inorganic phosphor which is chemically inert with respect to said polymeric compound.

4. A method as set forth in claim 1 in which said dispersing step comprises dispersing particles of an inorganic phosphor which is chemically inert with respect to said polymeric compound and is stable at temperatures below 400°F.

5. A method as set forth in claim 1 in which said dispersing step comprises dispersing particles of said particular phosphor each having a size generally of the order of 25 microns median diameter and less.

6. A method as set forth in claim 1 in which said step of freshly exposing is achieved during processing of said compound.

7. A method as set forth in claim 1 in which said step of freshly exposing is achieved after said compound has been made into an end product.

8. A method as set forth in claim 1 in which said dispersing step is achieved during compounding of said polymeric compound in a mill mix cycle.

9. A method as set forth in claim 1 in which said identifying step is achieved using optical visualization techniques.

10. A method as set forth in claim 1 in which said subjecting step comprises subjecting the freshly exposed surface to a source of radiant energy which is confined to the ultraviolet portion of the electromagnetic spectrum.

11. A method of permanently coding and identifying a particular elastomeric compound using phosphor particles to provide the coding comprising the steps of, dispersing particles of a particular phosphor throughout said elastomeric compound during compounding thereof to provide a coded compound, freshly exposing a surface of the coded compound after provision thereof, subjecting the freshly exposed surface to a source of ultraviolet radiation causing said particles to absorb said radiation to provide momentary excitation thereof and allowing said excited phosphor particles to emit visible radiation, and identifying the emitted visible radiation to identify said particular phosphor and its elastomeric compound.

12. A method as set forth in claim 11 in which said identifying step is achieved visually using dark room means.

13. A method as set forth in claim 11 in which said dispersing step comprises dispersing particles of an inorganic phosphor which is stable at temperatures below 400°F and which is chemically inert with respect to said elastomeric compound.

14. A method as set forth in claim 13 in which said dispersing step comprises dispersing particles of said particular phosphor having a size generally of the order of 25 microns median diameter and less.

15. A method as set forth in claim 4 in which said step of freshly exposing is achieved after said compound has been used to make an endless conveying belt.

16. A method as set forth in claim 14 in which said step of freshly exposing is achieved after said compound has been used to make an endless power transmission belt.

17. A method as set forth in claim 14 in which said step of freshly exposing is achieved after said compound has been used to make a hose construction.

18. A method as set forth in claim 15 in which said dispersing step is achieved during compounding of said elastomeric compound in a Banbury mixer.

19. A method as set forth in claim 11 in which said elastomeric compound is a rubber compound and comprising the further step of vulcanizing said rubber compound prior to said step of freshly exposing a surface thereof.

20. A permanently coded polymeric compound having particles of a particular phosphor dispersed therethrough in a random manner, said particles being particularly adapted to be excited upon freshly exposing a surface of said compound and subjecting the freshly exposed surface to a source of radiant energy so that said particles emit radiant energy which is identifiable to thereby enable identification thereof and of its polymeric compound.

21. A compound as set forth in claim 20 in which said permanently coded polymeric compound is an elastomeric compound.

22. A compound as set forth in claim 21 in which said elastomeric compound comprises a part of an endless power transmission belt.

23. A compound as set forth in claim 21 in which said elastomeric compound comprises a part of a hose construction.

24. A compound as set forth in claim 21 in which said particles of said particular phosphor are particles of an inorganic phosphor which is chemically inert with respect to said elastomeric compound and is stable at temperatures below 400° F.

25. A compound as set forth in claim 24 in which said particles of an inorganic phosphor have a size generally of the order of 25 microns median diameter and less.

* * * * *

UNITED STATES PATENT OFFICE
CERTIFICATE OF CORRECTION

PATENT NO. : 3,912,928
DATED : October 14, 1975
INVENTOR(S) : James B. Rush and Arthur D. Logan It is certified that error appears in the above-identified patent and that said Letters Patent are hereby corrected as shown below:

Column 6, line 21, "4" should be --- 14 ---

Signed and Sealed this thirtieth Day of December 1975

[SEAL]

Attest:

RUTH C. MASON
Attesting Officer

C. MARSHALL DANN
Commissioner of Patents and Trademarks